US012762746B2

(12) United States Patent
Wang et al.

(10) Patent No.: US 12,762,746 B2
(45) Date of Patent: Oct. 13, 2026

(54) METHOD FOR MEASURING COLOR DIFFERENCE, ELECTRONIC DEVICE AND STORAGE MEDIUM

(71) Applicants: ZHEJIANG HENGYI PETROCHEMICAL CO., LTD., Hangzhou (CN); Hangzhou Xinye Optoelectronic Engineering Co., Ltd., Hangzhou (CN)

(72) Inventors: Peng Wang, Hangzhou (CN); Xinyi Ye, Hangzhou (CN); Xiantao Peng, Hangzhou (CN); Mingyi Liu, Hangzhou (CN); Zichun Mao, Hangzhou (CN); Luhang Zheng, Hangzhou (CN)

(73) Assignees: Zhejiang Hengyi Petrochemical Co., Ltd., Hangzhou (CN); Hangzhou Xinye Optoelectronic Engineering Co., Ltd., Hangzhou (CN)

( * ) Notice: Subject to any disclaimer, the term of this patent is extended or adjusted under 35 U.S.C. 154(b) by 222 days.

(21) Appl. No.: 18/778,237

(22) Filed: Jul. 19, 2024

(65) Prior Publication Data

US 2025/0095208 A1 Mar. 20, 2025

(30) Foreign Application Priority Data

Sep. 19, 2023 (CN) ........................ 202311216712.2

(51) Int. Cl.
*G06T 7/90* (2017.01)
*D06H 3/02* (2006.01)
(Continued)

(52) U.S. Cl.
CPC ................ *G06T 7/90* (2017.01); *D06H 3/02* (2013.01); *G06T 7/0004* (2013.01); *G06V 10/26* (2022.01);
(Continued)

(58) Field of Classification Search
CPC .................... G06T 7/90; G06T 7/0004; G06T 2207/10024; G06T 2207/20084;
(Continued)

(56) References Cited

U.S. PATENT DOCUMENTS 7,333,201 B1 * 2/2008 Fernandez ......... G01N 21/8983 356/402
2018/0216273 A1 * 8/2018 Alon ..................... D05C 13/02

FOREIGN PATENT DOCUMENTS

CN 1844550 A 10/2006
CN 105787508 A 7/2016
(Continued)

OTHER PUBLICATIONS

Jan. 21, 2025—(EP) Extended Search Report—App 24190411.9.
Sep. 8, 2025—JP—Notice of Reasons for Refusal—App. No. 2024-161260.

*Primary Examiner* — Matthew C Bella
*Assistant Examiner* — Andrew B. Jones
(74) *Attorney, Agent, or Firm* — Banner & Witcoff, Ltd.

(57) ABSTRACT

Provided is a method for measuring a color difference, an electronic device and a storage medium. The method includes: conveying respective fabric segments of the fabric to be detected sequentially to a measurement port of a detection portion, so as to collect color values at a plurality of sampling points; determining a time range in which a target segment of the fabric to be detected passes through the measurement port of the detection portion; the target segment being any one fabric segment of the fabric to be detected; selecting an effective sampling point of the target segment based on the time range and sampling time points of the plurality of sampling points; and determining a corresponding color difference value of a target yarn spindle based on a color value and standard value of the effective sampling point.

17 Claims, 7 Drawing Sheets

(51) Int. Cl.
*G06T 7/00* (2017.01)
*G06V 10/26* (2022.01)
*G06V 10/62* (2022.01)
*G06V 10/82* (2022.01)

(52) U.S. Cl.
CPC .............. *G06V 10/62* (2022.01); *G06V 10/82* (2022.01); *G06T 2207/10024* (2013.01); *G06T 2207/20084* (2013.01); *G06T 2207/30124* (2013.01)

(58) Field of Classification Search
CPC .. G06T 2207/30124; D06H 3/02; D06H 3/08; G06V 10/26; G06V 10/62; G06V 10/82; G01N 21/255; G01N 2201/10; G01N 21/8983; G01N 21/251; G01N 21/01; G01N 21/896; G01N 2021/0112; Y02P 90/30
See application file for complete search history.

(56) References Cited

FOREIGN PATENT DOCUMENTS

| | | | | |
|---|---|---|---|---|
| CN | 217819970 | U | | 11/2022 |
| CN | 217980550 | U | | 12/2022 |
| EP | 3035035 | A1 | | 6/2016 |
| JP | S5199088 | A | | 9/1976 |
| JP | 8-15021 | A | | 1/1996 |
| JP | 2024063363 | A | * | 5/2024 |

* cited by examiner

METHOD FOR MEASURING COLOR DIFFERENCE, ELECTRONIC DEVICE AND STORAGE MEDIUM

CROSS-REFERENCE TO RELATED APPLICATIONS

The present application claims priority to Chinese Patent Application No. CN202311216712.2, filed with the China National Intellectual Property Administration on Sep. 19, 2023, the disclosure of which is hereby incorporated herein by reference in its entirety.

TECHNICAL FIELD

The present disclosure relates to the technical field of data processing, and more particularly to the technical field of measuring a color difference and the like.

BACKGROUND

A fabric is a flat soft piece of material made up of small and long soft objects that are crossed, entangled and connected. Fabrics may include woven fabrics, knitted fabrics, third fabrics, nonwoven fabrics, triaxial fabrics, three-dimensional fabrics, and the like. Any fabric can be dyed.

However, the actual color after dyeing may be deviated from the expected color. Therefore, it is necessary to detect the dyeing result of the fabric.

SUMMARY

The present disclosure provides a method and apparatus for measuring a color difference, a device and a storage medium, to solve or alleviate one or more technical problems in the prior art.

In a first aspect, the present disclosure provides a method for measuring a color difference, where a fabric to be detected is woven based on a plurality of yarn spindles, respective yarn spindles have respectively corresponding fabric segments on the fabric to be detected, and there is a segmentation band between different fabric segments, the method including:

conveying respective fabric segments of the fabric to be detected sequentially to a measurement port of a detection portion, so that the detection portion collects color values at a plurality of sampling points on the fabric to be detected according to a preset sampling time point sequence;

determining a time range in which a target segment of the fabric to be detected passes through the measurement port of the detection portion during a process of conveying to the detection portion for sampling; the target segment being any fabric segment of the fabric to be detected;

selecting an effective sampling point of the target segment from the plurality of sampling points based on the time range and sampling time points of the plurality of sampling points; and determining a color difference value of a target yarn spindle corresponding to the target segment based on a color value and standard value of the effective sampling point.

In a second aspect, the present disclosure provides an apparatus for measuring a color difference, where a fabric to be detected is woven based on a plurality of yarn spindles, respective yarn spindles have respectively corresponding fabric segments on the fabric to be detected, and there is a segmentation band between different fabric segments, the apparatus including:

a conveying module, configured to convey respective fabric segments of the fabric to be detected sequentially to a measurement port of a detection portion, so that the detection portion collects color values at a plurality of sampling points on the fabric to be detected according to a preset sampling time point sequence;

a first determining module, configured to determine a time range in which a target segment of the fabric to be detected passes through the measurement port of the detection portion during a process of conveying to the detection portion for sampling; the target segment being any fabric segment of the fabric to be detected;

a selecting module, configured to select an effective sampling point of the target segment from the plurality of sampling points based on the time range and sampling time points of the plurality of sampling points; and a second determining module, configured to determine a color difference value of a target yarn spindle corresponding to the target segment based on a color value and standard value of the effective sampling point.

In a third aspect, provided is an electronic device, including:

at least one processor; and a memory connected in communication with the at least one processor;

where the memory stores an instruction executable by the at least one processor, and the instruction, when executed by the at least one processor, enables the at least one processor to execute the method of any embodiment of the present disclosure.

In a fourth aspect, provided is a non-transitory computer-readable storage medium storing a computer instruction thereon, where the computer instruction is used to cause a computer to execute the method of any embodiment of the present disclosure.

In a fifth aspect, provided is a computer program product, including a computer program, where the computer program, when executed by a processor, the method of any embodiment of the present disclosure is implemented.

The beneficial effects of the technical solution provided in the present disclosure at least include: the time range in which a target segment of the fabric to be detected passes through the measurement port of the detection portion is compared with sampling time points of a plurality of sampling points to obtain a color value of an effective sampling point, which is beneficial to improving the accuracy of detecting a color of a fabric to be detected based on the detection portion. Based on the color value of the effective sampling point, the determined color difference value can be more accurate, thereby improving the accuracy of the color difference result of the yarn spindle corresponding to the fabric to be detected.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

DETAILED DESCRIPTION

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements, circuits, and the like that are well known to those having ordinary skill in the art are not described in detail, in order to highlight the subject matter of the present disclosure.

Figure 1:
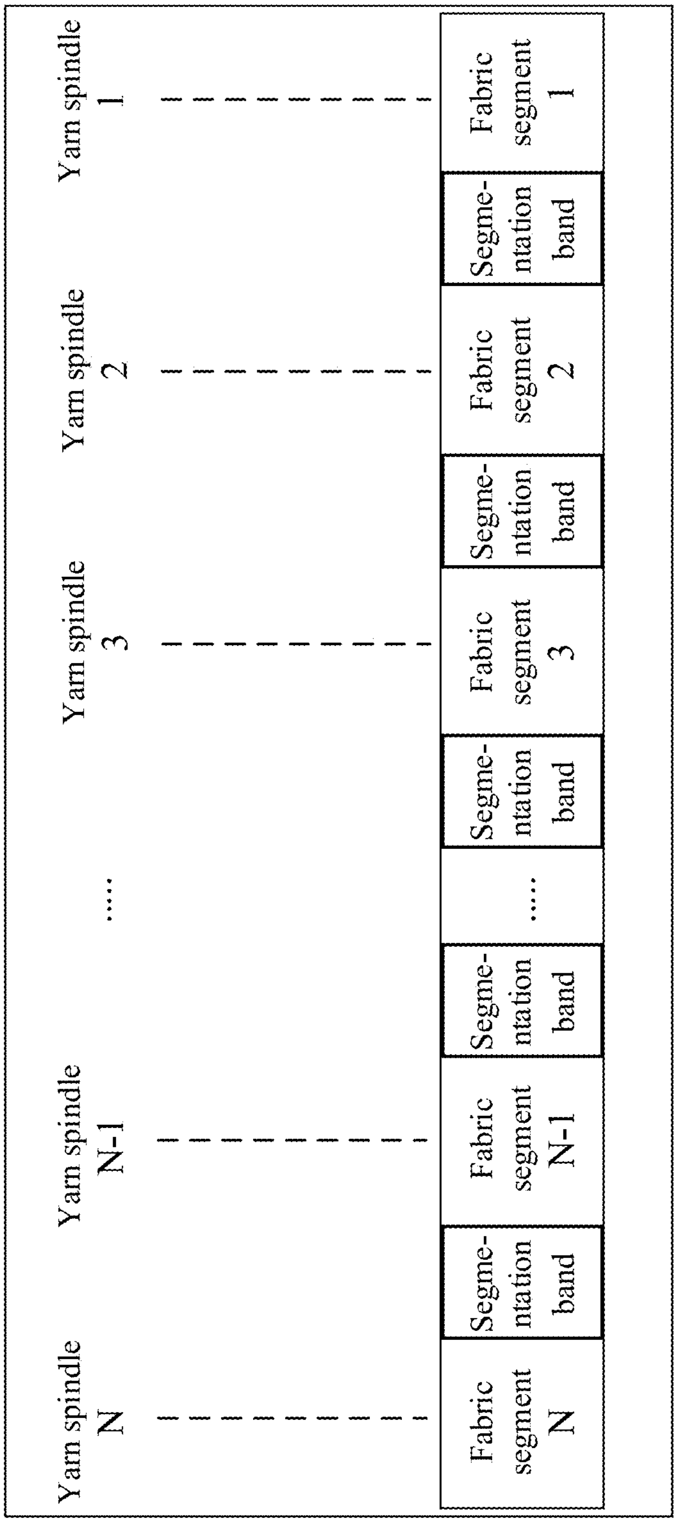
FIG. 1 is a schematic structural diagram of a fabric to be detected according to an embodiment of the present disclosure.

The silk fabric is woven from the silk on the yarn spindle. In an embodiment of the present disclosure, a color detector is required to detect a dyeing result of the silk on each yarn spindle. Here, in order to improve the detection efficiency, in the disclosed embodiment, a plurality of yarn spindles are woven into one fabric to be detected, and respective yarn spindles have respectively corresponding fabric segments on the fabric to be detected, and there is a segmentation band between different fabric segments. As shown in FIG. 1, which is a schematic structural diagram of a fabric to be detected in an embodiment of the present disclosure. In FIG. 1, the fabric to be detected is woven by a fabric segment 1, a fabric segment 2, a fabric segment 3, . . . and a fabric segment N, and there is a segmentation band between the fabric segment 1 and the fabric segment 2, a segmentation band between the fabric segment 2 and the fabric segment 3, and a segmentation band between the fabric segment N−1 and the fabric segment N. Accordingly, each fabric segment has a corresponding relationship to each yarn spindle. Specifically, the fabric segment 1 corresponds to the yarn spindle 1, the fabric segment 2 corresponds to the yarn spindle 2, the fabric segment 3 corresponds to the yarn spindle 3, and the fabric segment N corresponds to the yarn spindle N. Here, N is a positive integer greater than or equal to 1.

Here, the widths of the segmentation bands may be the same or different. Thus, the detection of a plurality of yarn spindles can be achieved by one fabric to be detected.

Figure 2:
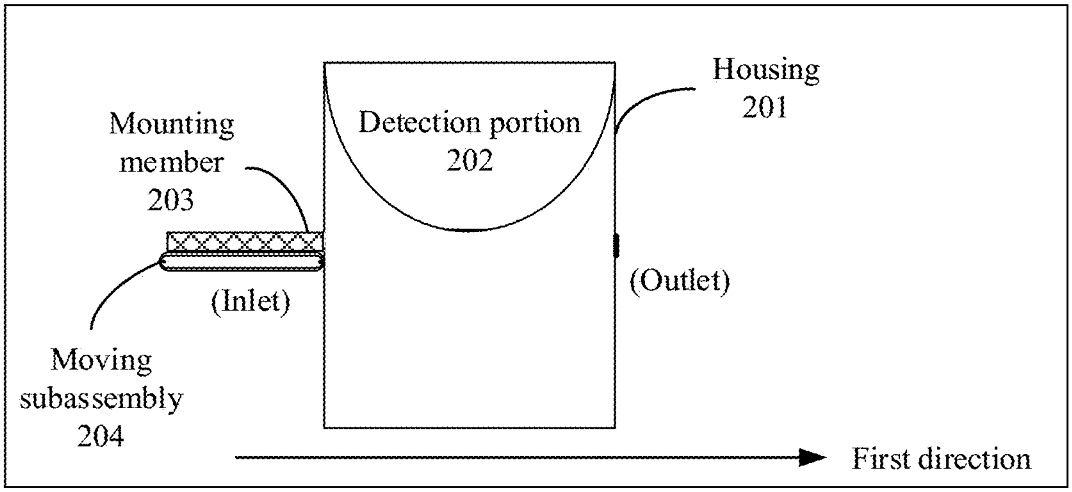
FIG. 2 is a schematic structural diagram of a color detector according to another embodiment of the present disclosure.

As shown in FIG. 2, which is a schematic structural diagram of a color detector according to an embodiment of the present disclosure. The core components included therein include a housing 201, a detection portion 202 located inside the housing, the housing having an inlet and an outlet disposed oppositely in a first direction, a mounting member 203, and a moving subassembly 204.

The detection portion 202 is used for detecting the color of the fabric to be detected. The core components of the detection portion 202 may be composed of a spectrometer or a chromometer, and the embodiment of the present disclosure is not limited thereto, as long as it may measure the color value of the fabric to be detected. The mounting member 203 is used for sleeving the fabric to be detected. The moving subassembly 204 is connected with the mounting member 203. The moving subassembly 204 is used to drive the fabric to be detected to move relative to the housing 201 in a first direction so that the fabric to be detected enters the housing 201 from the inlet and can pass out of the housing 201 from the outlet, so that the fabric to be detected can pass through the measurement port of the detection portion 202 during the conveying of the fabric to be detected so as to realize the color measurement at the sampling point of the fabric to be detected.

As a result, the color detector may sample a plurality of sampling points of the fabric to be detected. When implemented, a preset sampling time point sequence may be set, and the sequence includes a plurality of time points, such as sequences 1<t1, t2 . . . tn>. The detection portion performs sampling according to the sequence.

Figure 3:
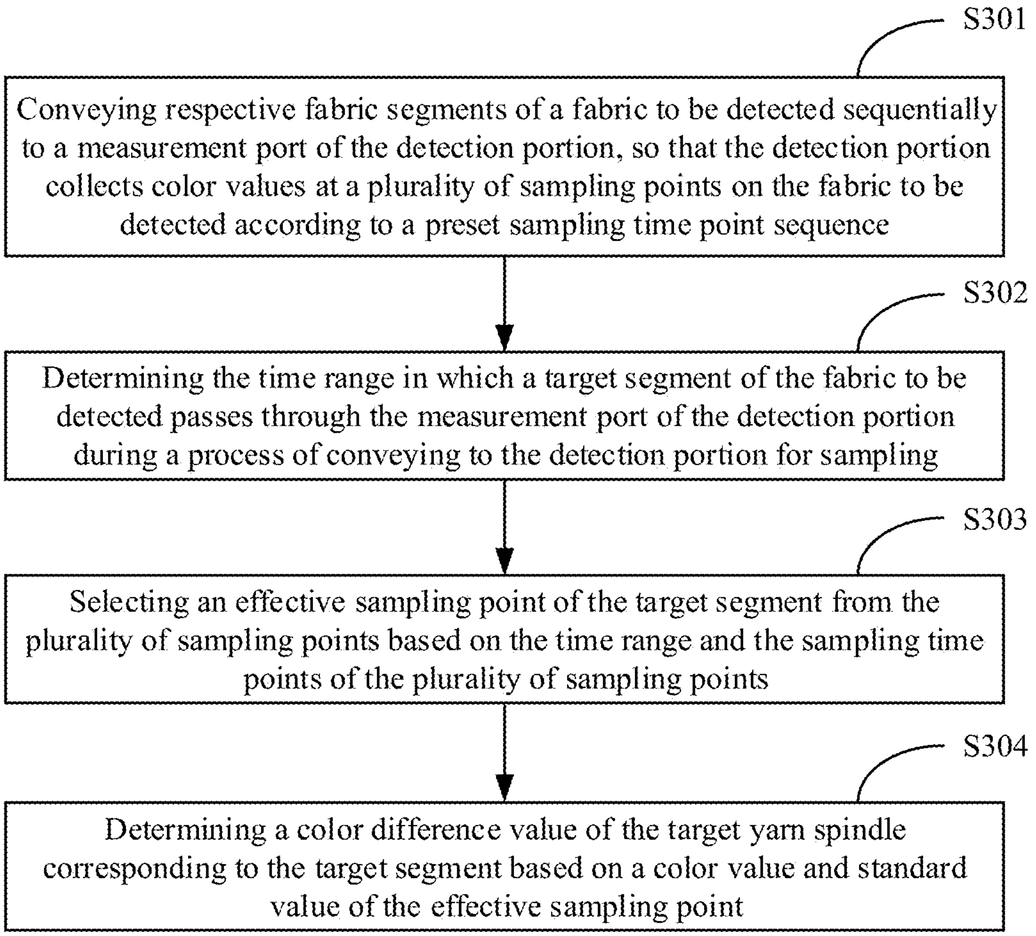
FIG. 3 is a flow chart of a method for measuring a color difference according to another embodiment of the present disclosure.

An embodiment of the present disclosure provides a method for measuring a color difference due to the need to detect the color value of each yarn spindle. As shown in FIG. 3, which is a flow chart of a method for measuring a color difference in an embodiment of the present disclosure, which includes the following steps.

S301, conveying respective fabric segments of a fabric to be detected sequentially to a measurement port of the detection portion, so that the detection portion collects color values at a plurality of sampling points on the fabric to be detected according to a preset sampling time point sequence.

Here, the detection portion samples the color value of the fabric to be detected. Since the color value for a single sample point may have limitations, a sufficient number of color values for sample points will generally be acquired. The setting of the number of sampling points is not limited in embodiments of the present disclosure.

The preset sampling time point may be determined in a plurality of manners, and a plurality of the preset sampling time points constitute a preset sampling time point sequence, and the determining manner of the preset sampling time point is not limited in embodiments of the present disclosure. For example, it may be directly set manually. Specifically, in the case where two sampling points are set for each fabric segment, <$t_{1_1}$, $t_{1_2}$, $t_{2_1}$, $t_{2_2}$, $t_{3_1}$, $t_{3_2}$> can be directly set manually as a sampling time point sequence.

In addition, the preset sampling time point sequence may be obtained by calculation. In a possible implementation, the first sampling time point for the fabric segment 1 may be set to $t_{1_1}$, and a sampling time span is set to $t'$. On this basis, for other respective portions of the fabric segment, the sampling time point +t for the previous fabric segment is set to be the sampling time point for the next portion of the fabric segment. That is, the sampling time points of the fabric segment 1 is $t_{1_1}$ and $t_{1_1}+t'$; the sampling time points of the fabric segment 2 are $t_{1_1}+t$ and $(t_{1_1}+t)+t'$; and the sampling time points of the fabric segment 3 are $(t_{1_1}+t)+t$ and $(t_{1_1}+t)+t+t'$, and then the preset sampling time point sequence is $t_{1_1}$, $t_{1_1}+t'$, $t_{1_1}+t$, $(t_{1_1}+t)+t'$, $(t_{1_1}+t)+t$, and $(t_{1_1}+t)+t+t'$. For this calculation method, in the case where three sampling points are set for each fabric segment, the first sampling time point for the fabric segment 1 is set to $t_{1_1}$, and the sampling time span is set to $t''$, and for other respective portions of the fabric segment, the sampling time point +t for the previous fabric segment is set to be the sampling time point for the next portion of the fabric segment. Thus, on this basis, the sampling time points of the fabric segment 1 are $t_{1_1}$, $t_{1_1}+t''$, $t_{1_1}+2t''$; the sampling time points of the fabric segment 2 are $t_{1_1}+t$, $(t_{1_1}+t)+t''$, $(t_{1_1}+t)+2t''$; and the sampling time points of the fabric segment 3 are $t_{1_1}+2t$, $(t_{1_1}+2t)+t''$, $(t_{1_1}+2+)+2t''$, and then the preset sampling time point sequence is $t_{1_1}$, $t_{1_1}+t''$, $t_{1_1}+2t''$, $t_{1_1}+t$, $(t_{1_1}+t)+t''$, $(t_{1_1}+t)+2t''$, $t_{1_1}+2t$, $(t_{1_1}+2t)+t''$, $(t_{1_1}+2t)+2t''$. Similarly, for the case that four or more sampling points are set for each fabric segment, and so on.

In another possible embodiment, in the case where two sampling points are set for each fabric segment, the sampling time point for the first portion of the fabric segment may be set to $t_{1_1}$ and $t_{1_2}$, and on this basis, for other respective portions of the fabric segment, the sampling time point +t of the first portion of the fabric segment is set to be the sampling time point for the next portion of the fabric segment, that is, the sampling time points of the second portion of the fabric segment are $t_{1_1}+t$ and $t_{1_2}+t$; the sampling time points of the third portion of the fabric segment are $t_{1_1}+2t$ and $t_{1_2}+2t$, and then the preset sampling time point sequence is $t_{1_1}$, $t_{1_2}$, $t_{1_1}+t$, $t_{1_2}+t$, $t_{1_1}+2t$ and $t_{1_2}+2t$. Similarly, for the case that three or more sampling points are set for each fabric segment, and so on.

However, during the use of the detection portion, the state of the fabric to be detected may affect the detection result of the color difference. For example, in the process of sleeving the fabric to be detected to the mounting member, the fabric to be detected is inevitably stretched, and if the stretched tension is not uniform, then the partial width (i.e., the width in a direction in which the fabric segments are connected in series) of the fabric to be detected will deviate from the expected width. When sampling the fabric to be detected by the detection portion, the sampling point obtained may be inaccurate. For example, the sampling point may deviate from the to-be-sampled portion of the fabric to be detected, and then the measured color of the fabric to be detected may be different from the expected color of the fabric to be detected, thereby affecting the detection result of the color difference of the yarn spindle analyzed based on the measured color of the fabric to be detected. However, it is often difficult to fundamentally avoid stretching of the fabric to be detected, subject to hardware installation conditions. Therefore, if the problem that the sampling of the detection portion may be inaccurate can be overcome in the case where the fabric to be detected is stretched, then the problem that the color difference of the yarn spindle measured by the detection portion may be inaccurate can be effectively solved.

Thus, in S302, during a process of conveying the fabric to be detected to the detection portion through the mounting member and the moving subassembly for sampling, the time range in which a target segment of the fabric to be detected passes through the measurement port of the detection portion may be determined.

Here, the target segment is any fabric segment in the fabric to be detected. The time range in which the target segment of the fabric to be detected passes through the measurement port of the detection portion is understood to be a time period between the time at which the target segment initially reaches the measurement port of the detection portion and the time at which the target segment leaves the measurement port of the detection portion.

S303, selecting an effective sampling point of the target segment from the plurality of sampling points based on the time range and the sampling time points of the plurality of sampling points.

The plurality of sampling points collected on the fabric to be detected are not all effective for the target segment. That is, when the sampling time points are within the time range, the corresponding sampling points are effective sampling points belonging to the target segment. Accordingly, when the sampling time points are not within the time range, the corresponding sampling points are ineffective sampling points for the target segment, and it is necessary to discard these ineffective sampling points.

S304, determining a color difference value of the target yarn spindle corresponding to the target segment based on a color value and standard value of the effective sampling point.

Here, the standard value may be determined by customizing, that is, any color value may be set to a standard value (i.e., an expected value) according to actual requirements. The color difference value may be obtained from a color value and a standard value.

In an embodiment of the present disclosure, the time range of the target segment passing through the measurement port of the detection portion is compared with the sampling time points of the plurality of sampling points to select an effective sampling point of the target segment, thereby obtaining the color value of the effective sampling point, which is conducive to improving the accuracy of detecting the color of the fabric to be detected based on the detection portion. Compared with determining the color difference value of the target yarn spindle corresponding to the target segment directly based on the color values of the plurality of sampling points, it can make the determined color difference value more accurate based on the color value of the effective sampling point, thereby improving the accuracy of the color difference result of the yarn spindle corresponding to the fabric to be detected.

In some embodiments, the effective sampling point is a sampling point that is not on the segmentation band of the target segment.

Here, since the segmentation band of the target segment may occupy a certain width in the fabric to be detected, the sampling points for the target segment may alternatively fall on the segmentation band of the target segment, and this part of the sampling points that fall on the segmentation band of the target segment should also be discarded, that is, the effective sampling points do not include the sampling points falling on the segmentation band of the target segment.

In an embodiment of the present disclosure, since there is also a difference in color values between the target segment and segmentation bands of the target segment, and the segmentation bands are not strictly equivalent to the yarn spindle corresponding to the target segment, the sampling points on the segmentation bands of the target segment are not used as effective sampling points, which is beneficial to avoiding the influence of the color values of the sampling points on the segmentation bands on the color values of the target segment, thereby improving the accuracy of the color value and color difference value of the target segment measured based on the effective sampling points.

In some embodiments, determining the time range in which a target segment of the fabric to be detected passes through the measurement port of the detection portion may be achieved in two approaches:

Approach 1

Step A1, in a case where a tension fluctuation of the fabric to be detected is less than a fluctuation threshold value in a whole conveying process, acquiring a total time consumption for conveying the fabric to be detected to completely pass through the measurement port.

Here, the tension fluctuation of the fabric to be detected during the whole conveying process may be measured by a tension sensor, and the fluctuation threshold value is a criterion for measuring the amplitude of the tension fluctuation. In the case where the tension fluctuation of the fabric to be detected is less than the fluctuation threshold value in the whole conveying process, that is, the tension is even, the widths of respective fabric segments throughout the fabric to be detected may be considered to be the same. The tension fluctuation of the fabric to be detected in the whole conveying process may be controlled by a PID (proportional, integral, and derivative) control algorithm.

Step A2, determining a conveying time consumption required for the target segment based on the total time consumption to obtain a time range.

Here, in the case where the widths of respective fabric segments are the same throughout the fabric to be detected, if the total number of fabric segments in the fabric to be detected is known, then a conveying time consumption required for any fabric segment in the fabric to be detected can be obtained by dividing the total time consumption by the total number of fabric segments, and the conveying time consumptions required for respective fabric segments are the same, and then the conveying time consumption required for the target segment can be known. According to the embodiment of the present disclosure, the conveying time consumption required by the target segment is taken as the time range in which the target segment passes through the measurement port of the detection portion.

In an embodiment of the present disclosure, in the case where the tension of the fabric to be detected is even in the whole conveying process, the time range in which the target segment passes through the measurement port of the detection portion can be determined directly based on the total number of fabric segments in the fabric to be detected and the total time consumption for conveying the fabric to be detected to the measurement port, thereby improving the efficiency of determining the time range.

Approach 2

Step B1, in a case where a tension fluctuation of the fabric to be detected is greater than a fluctuation threshold value in a whole conveying process, acquiring a conveying process image of conveying the fabric to be detected to the measurement port of the detection portion.

Here, when the tension fluctuation measured by the tension sensor is greater than the fluctuation threshold value, that is, the tension is uneven, then the widths corresponding to respective fabric segments throughout the fabric to be detected are generally not the same. In this case, it is difficult to determine the time range in which the target segment passes through the measurement port of the detection portion by the above-mentioned approach 1. Based on this, in the process of conveying the fabric to be detected to the detection portion for sampling, the conveying process image of the fabric to be detected may be simultaneously acquired based on a line-scan camera.

Here, the line-scan camera may scan an object passing through the camera of the line-scan camera to obtain a single row of a pixel line of the scanned object. The software on the visual processor or image capture card will store these single rows of pixel lines and then reconstruct the single rows of pixel lines into the final two-dimensional image of the scanned object. The line-scan camera typically requires shorter exposure time than an area-scan camera, and the cost of obtaining an image is lower than the area-scan camera, thus the image collection manner of the line-scan camera is suitable for collecting high-resolution images of fast-moving objects, such as fast-moving fabrics, and the like.

In an embodiment of the present disclosure, since the fabric to be detected is moving in the detection portion, and the moving speed is generally high, a line-scan camera may be used to scan the pixel line of a single line of the fabric to be detected in the passing order, so as to construct a conveying process image of conveying the fabric to be detected to the measurement port of the detection portion.

Figure 4:
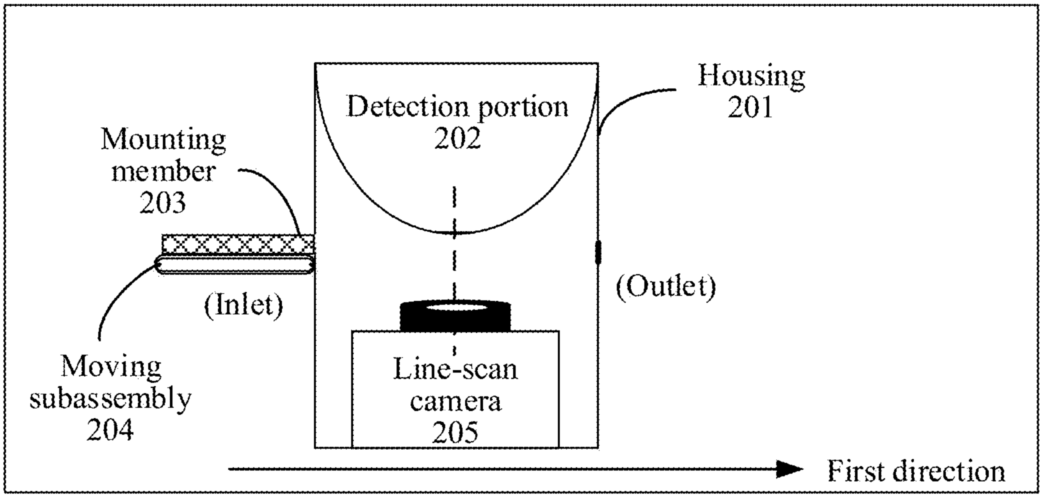
FIG. 4 is a schematic structural diagram of a color detector according to another embodiment of the present disclosure.

FIG. 4 is a schematic structural diagram of a color detector including a line-scan camera 205 in an embodiment of the present disclosure. As shown in FIG. 4, in which the line-scan camera 205 is located in the interior of the housing 201 of the color detector, and needs to respectively scan and sample the fabric to be detected at the same position and the same time point as the detection portion 202 so as to directly compare the time points.

Figure 5:
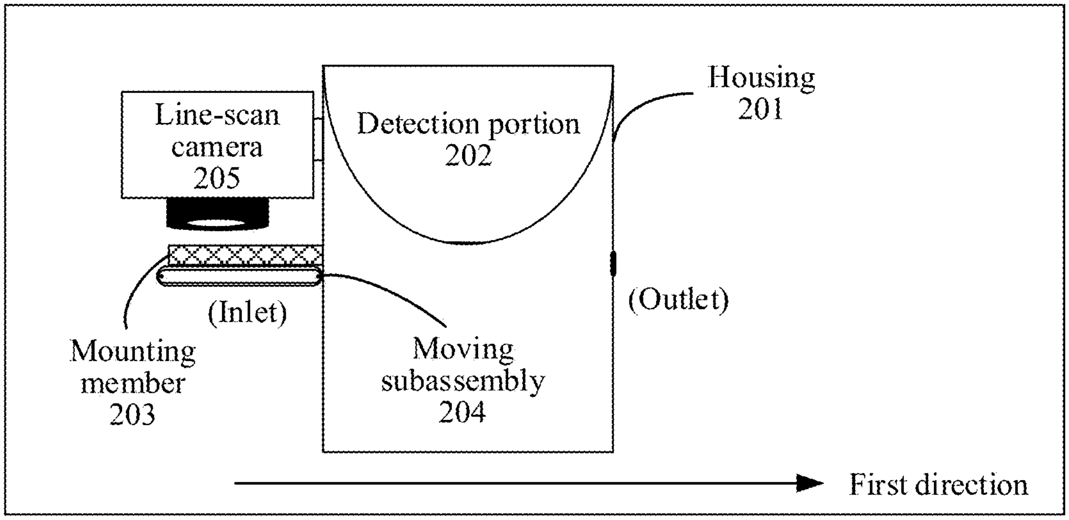
FIG. 5 is a schematic structural diagram of a color detector according to another embodiment of the present disclosure.

FIG. 5 is a schematic structural diagram of another color detector including a line-scan camera 205 in an embodiment of the present disclosure. As shown in FIG. 5, in which the line-scan camera 205 is located outside the housing 201 of the color detector, and implements the scanning of the fabric to be detected to obtain a conveying process image, and the specific position of the line-scan camera is not limited in the present disclosure. At this time, the scanning time point of the line-scan camera 205 for the target position on the fabric to be detected may be aligned with the sampling time point of the target position by the detection portion 202 by calculating, and then comparing the two time points.

Step B2, performing an image analysis on the conveying process image to determine the time range in which the target segment passes through the measurement port of the detection portion.

In an embodiment of the present disclosure, when the influence of the tension fluctuation is large, the line-scan camera is used to scan the fabric to be detected so as to obtain the conveying process image of conveying the fabric to be detected to the measurement port of the detection portion, and on the basis of lower cost and higher quality of the conveying process image compared to the area-scan camera, it is advantageous to determine the time range in which the target segment passes through the measurement port of the detection portion based on the conveying process image.

In implementation, image analysis may be achieved in two approaches.

Approach 1): performing an image analysis by a color value of a row pixel.

Step C1, analyzing color values of row pixels of the conveying process image to recognize a segmentation band of different fabric segments.

Here, since the segmentation band has a color value, and the color values of the fabric segments and the segmentation band are different, adjacent fabric segments are separated by the segmentation band, the segmentation band between the fabric segments may be recognized in the fabric to be detected. For example, with the fabric to be detected in FIG. 1 as an example, the actual segmentation band of the fabric to be detected has a significant color difference from the surrounding areas. On this basis, when it is detected that the color difference between the pixels of the previous row and the pixels of the next row in the fabric to be detected is greater than a color difference threshold value, it may be determined that the pixels of the previous row or the pixels of the next row are a junction of one segmentation band and one fabric segment. The start row and the end row of the segmentation band may thus be determined.

Step C2: determining a time range in which the target segment passes through the measurement port of the detection portion based on the scanning time of a segmentation band of the target segment.

Figure 6:
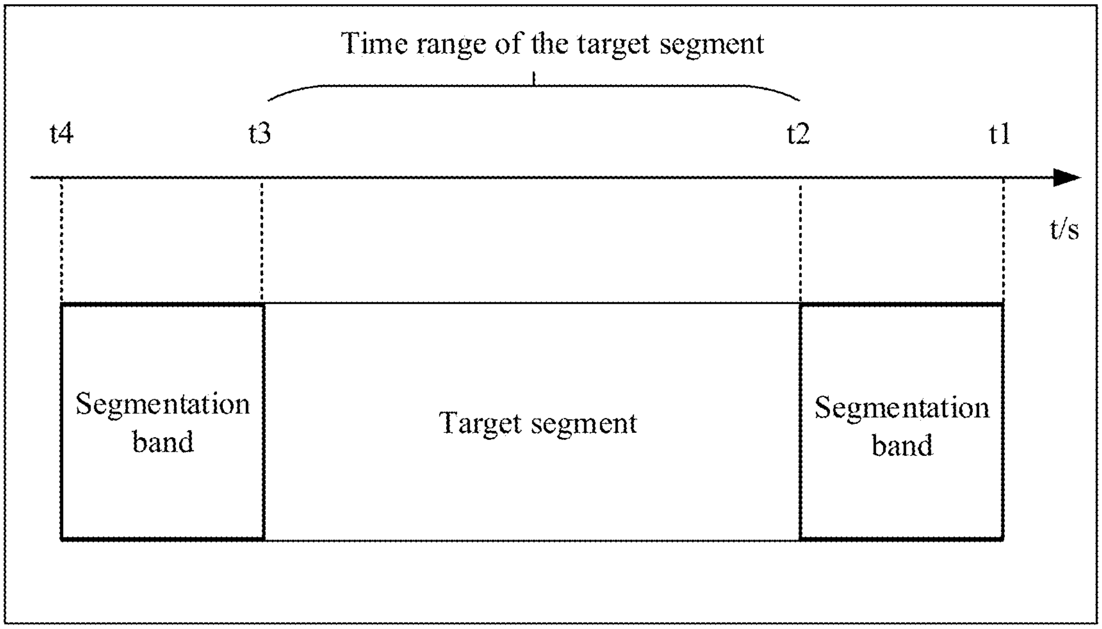
FIG. 6 is a schematic diagram of determining a time range of a target segment according to another embodiment of the present disclosure.

Here, the segmentation band may have a certain width in the fabric to be detected, that is, the segmentation band may be composed of a plurality of rows of pixels. Based on this, in the case where the time range in which the target segment passes through the measurement port is determined based on the scanning time of the segmentation band, the influence of the time range of the scanning segmentation band on the time range in which the target segment passes through the measurement port should be ignored. For example, as shown in FIG. 6, which is a schematic diagram of determining a time range of a target segment. In FIG. 6, the scanning time ranges of the segmentation bands are t1~t2 and t3~t4. In this case, the time range in which the target segment passes through the measurement port is determined based on the scanning time of the segmentation bands, and the time range is t2~t3.

In an embodiment of the present disclosure, by performing image analysis on the color values of the row pixels of the conveying process image, the segmentation band may be recognized based on different color values, and by determining the time range in which the target segment passes through the measurement port by the scanning time of the segmentation bands, it is conducive to accurately recognizing the time range in which the target segment passes through the measurement port of the detection portion.

Approach 2): performing an image analysis through a segmentation band recognition network.

Step D1, inputting the conveying process image into a pre-trained segmentation band recognition network to recognize a segmentation band of the target segment.

Here, by using a well-trained segmentation band recognition network, automatic recognition of segmentation bands in the conveying process images can be achieved, thereby recognizing the segmentation bands of the target segment.

Step D2, determining a time range in which the target segment passes through the measurement port of the detection portion based on the scanning time of the segmentation band of the target segment.

In an embodiment of the present disclosure, the segmentation bands of the target segment can be automatically recognized by performing image analysis of the conveying process image through the segmentation band recognition network, thereby improving the efficiency of recognizing the segmentation band. By determining the time range in which the target segment passes through the measurement port is determined by the scanning time of the segmentation bands, it is conducive to accurately recognizing the time range in which the target segment passes through the measurement port of the detection portion.

Since the tension fluctuation may cause the widths of respective fabric segments in the fabric to be detected to be different, at this time, if the target segment is sampled, it may occur the case that the obtained sampling points do not all belong to the target segment. For example, a sampling point may fall on a segmentation band or other fabric segment, and then the color value of the target segment calculated based on the sampling point may deviate, so that the color difference value of the target segment may be affected. Therefore, it is necessary to select effective sampling points that really belong to the target segment from a plurality of sampling points. For example, in FIG. 7, there are a target segment, a fabric segment 1, and a fabric segment 2. In this case, the target segment needs to be sampled, but the sampling point 1 of the target segment falls on the fabric segment 1, the sampling point 2 falls on the segmentation band, and the sampling point 5 falls on the fabric segment 2, and then in this case, the sampling point 3 and the sampling point 4 are effective sampling points of the target segment. The sampling point 5 is determined as the effective sampling point of the fabric segment 2 after the target segment, and the sampling point 1 is determined as the effective sampling point of the fabric segment 1 before the target segment.

In some embodiments, selecting an effective sampling point of the target segment from a plurality of sampling points may be based on the time range and the sampling time points of the plurality of sampling points, including the following steps.

Step E1, determining sampling time of the target segment from the preset sampling time point sequence.

Figure 7:
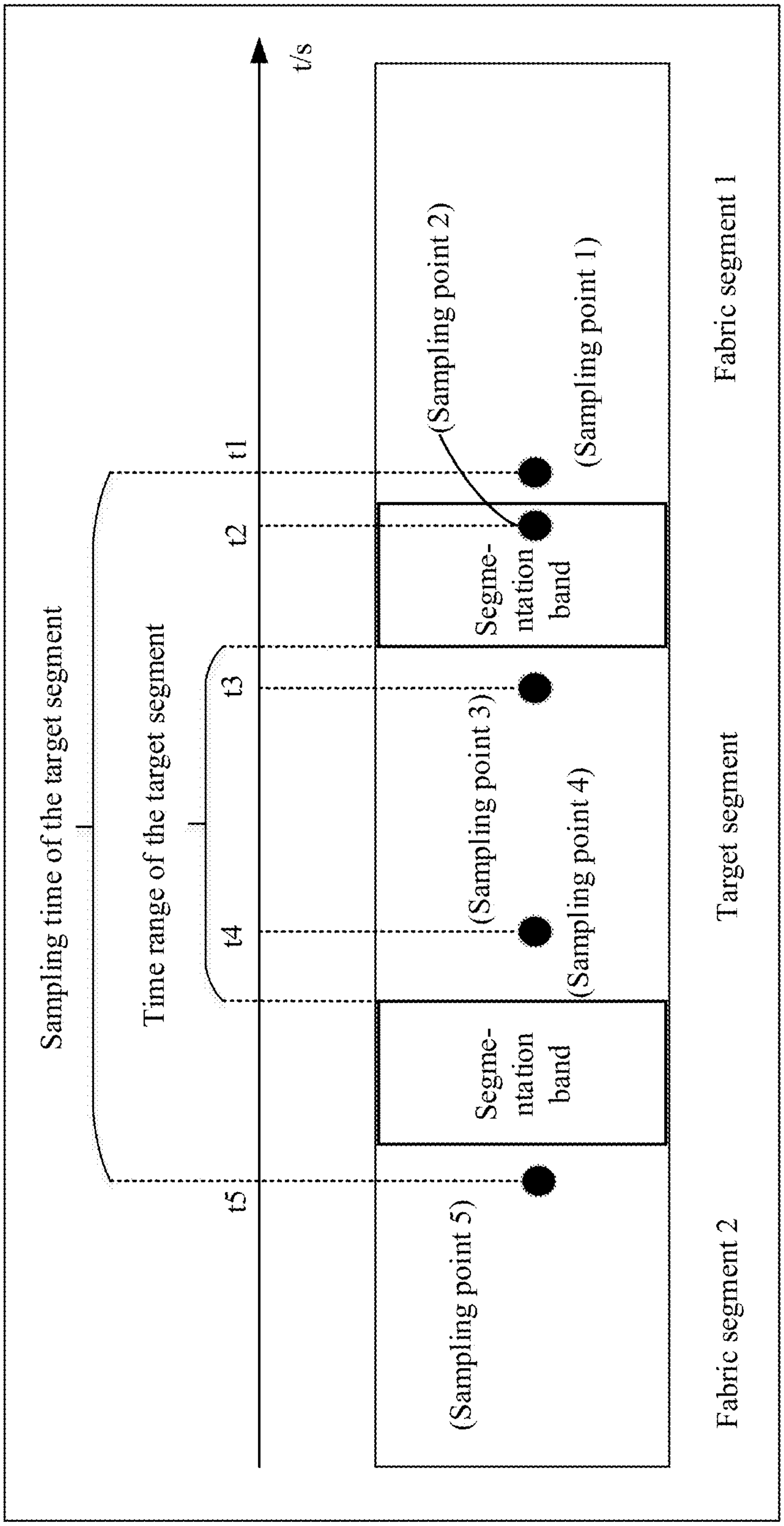
FIG. 7 is a schematic diagram of sampling a target segment according to another embodiment of the present disclosure.

In FIG. 7, the period from t1 corresponding to the sampling point 1 to t5 corresponding to the sampling point 5 is the sampling time of the target segment.

Step E2: selecting, based on the sampling time of the target segment, a sampling point within the time range as the effective sampling point of the target segment.

Here, the effective sampling points of the target segment are all derived from the target segment, that is, the effective sampling points of the target segment are all located on the target segment.

Figure 8:
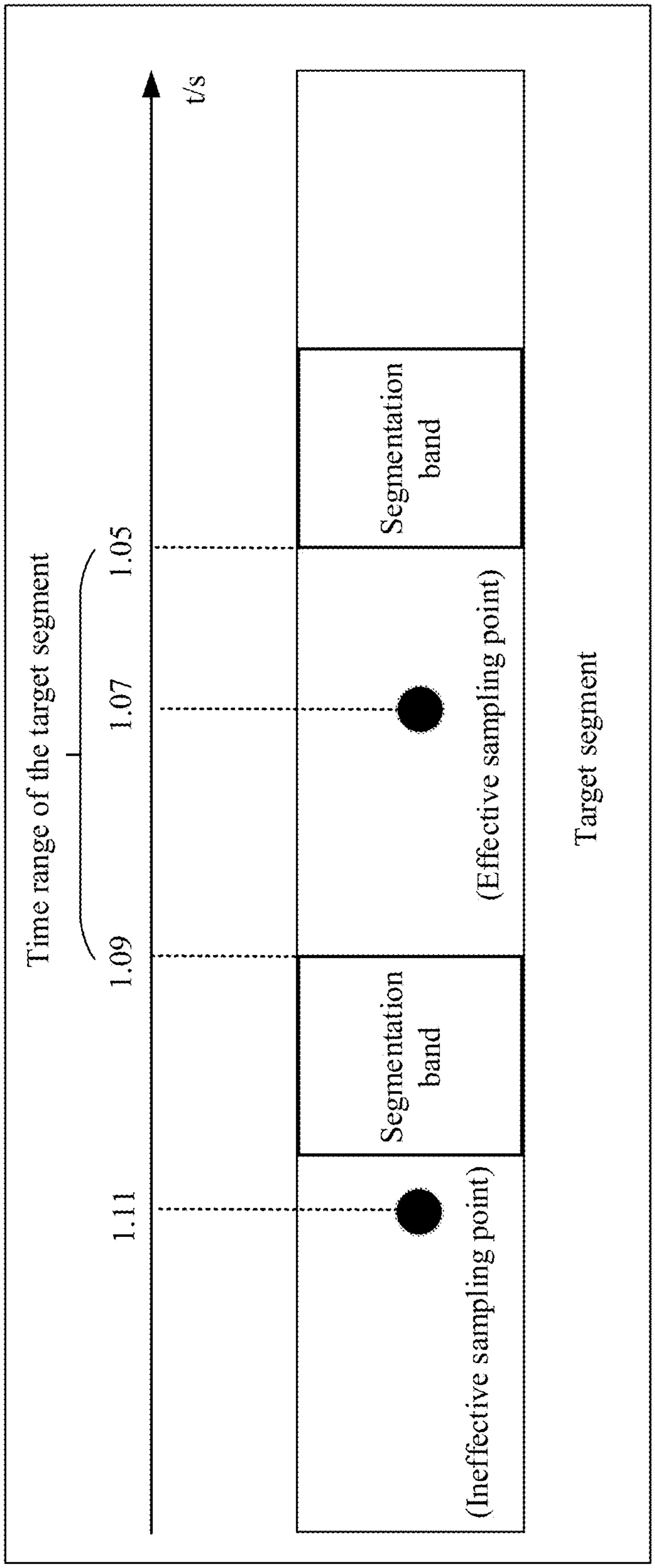
FIG. 8 is a schematic diagram of determining an effective sampling point of a target segment according to another embodiment of the present disclosure.

In order to better understand how to determine an effective sampling point of the target segment from a preset sampling time point sequence, the process will be described below in connection with FIG. 8. As shown in FIG. 8, which is a schematic diagram for determining an effective sampling point of the target segment in an embodiment of the present disclosure. In FIG. 8, the preset sampling time points are 1.07 s and 1.11 s, but the time range corresponding to the target segment is 1.05 s~1.09 s, and the preset sampling time point within the range of 1.05 s~1.09 s is 1.07 s, and then the sampling point corresponding to 1.07 s is an effective sampling point in the target segment.

In an embodiment of the present disclosure, by selecting an effective sampling point of the target segment from a plurality of sampling points, it can avoid affecting the calculated color value and color difference value of the target segment due to the sampling points falling on other fabric segments, which is beneficial to improving the accuracy of the color value and color difference value of the target segment measured based on the colorimeter.

In some embodiments, in a case where it is necessary to acquire the conveying process image of the fabric to be detected based on a line-scan camera, and to sample the fabric to be detected based on the detection portion to obtain an effective sampling point of the target segment, the system time of the line-scan camera and the system time of the detection portion may be synchronized so that the system time of the line-scan camera coincides with the system time of the detection portion, thereby facilitating direct comparison of the sampling time point and the time range of the target segment.

In some embodiments, the average value of the color values of a plurality of effective sampling points of the target segment may be calculated and used as the color value of the target segment, which is beneficial to reflecting the average level of the color value of the target segment, thereby improving the accuracy of determining the color value of the target segment.

In addition, after a sampling point of which the sampling time point is within a time range is selected as an effective sampling point of the target segment, a sampling point of which the sampling time point belongs to the target segment but is determined to be an ineffective sampling point may be merged into a set of to-be-processed points, and for each to-be-processed point in the set, the following operations are performed:

Step F1: determining a row pixel, of the conveying process image, whose collection time point is closest to the sampling time point of the to-be-processed point.

Step F2, in a case where the row pixel does not belong to the segmentation band, determining a fabric segment in which the row pixel is located.

Step F3: determining the to-be-processed point as an effective sampling point of the fabric segment in which the row pixel is located.

Continuing to take FIG. 7 as an example, in FIG. 7, during the sampling time of the target segment, the sampling point 1, the sampling point 2, and the sampling point 5 are out of the time range of the target segment and are ineffective sampling points of the target segment, and then the sampling point 1, the sampling point 2, and the sampling point 5 are merged into the set of to-be-processed points. For the sampling point 1 in the set of to-be-processed points, the row pixel closest to the sampling time point of the sampling point 1 belongs to the fabric segment 1, and then the sampling point 1 is an effective sampling point of the fabric segment 1. For the sampling point 2 in the set of to-be-processed points, the row pixel closest to the sampling time point of the sampling point 2 belongs to the segmentation band, and then the sampling point 2 is still regarded as an ineffective sampling point. For the sampling point 5 in the set of to-be-processed points, the row pixel closest to the sampling time point of the sampling point 5 belongs to the fabric segment 2, and then the sampling point 5 is an effective sampling point of the fabric segment 2.

In an embodiment of the present disclosure, after an effective sampling point of the target segment is selected, the sampling points other than the effective sampling point of the target segment in the sampling time of the target segment are used as the to-be-processed points for rejudging, so as to determine whether the to-be-processed points can be used as the effective sampling points of the other fabric segments, thereby improving the utilization rate of the sampling points.

Figure 9:
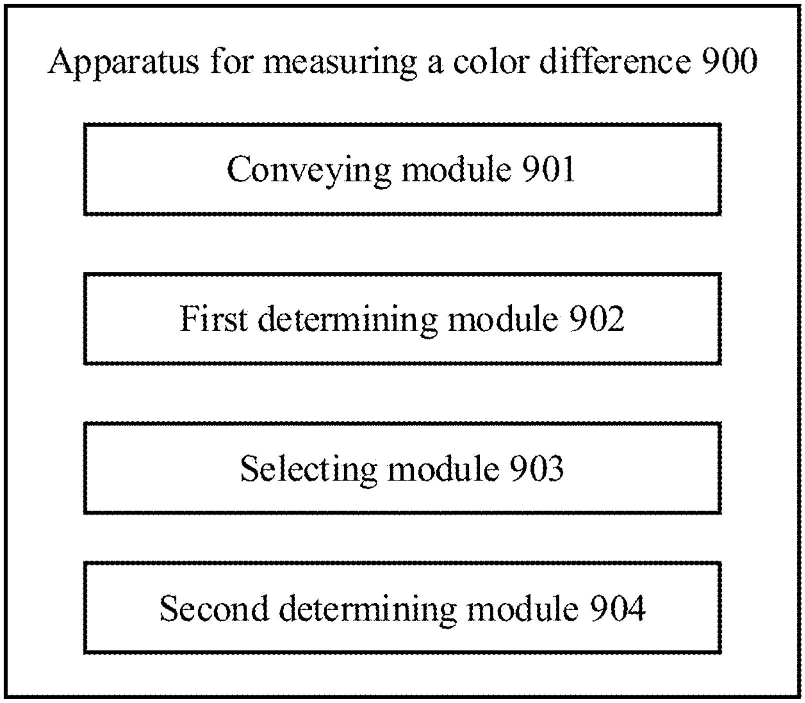
FIG. 9 is a schematic structural diagram of an apparatus for measuring a color difference according to another embodiment of the present disclosure.

Based on the same technical conception, an embodiment of the present disclosure provides an apparatus 900 for measuring a color difference, where a fabric to be detected is woven based on a plurality of yarn spindles, respective yarn spindles have respectively corresponding fabric segments on the fabric to be detected, and there is a segmentation band between different fabric segments. As shown in FIG. 9, the apparatus includes:

- a conveying module 901, configured to convey respective fabric segments of the fabric to be detected sequentially to a measurement port of a detection portion, so that the detection portion collects color values at a plurality of sampling points on the fabric to be detected according to a preset sampling time point sequence;
- a first determining module 902, configured to determine a time range in which a target segment of the fabric to be detected passes through the measurement port of the detection portion during a process of conveying to the detection portion for sampling; the target segment being any fabric segment of the fabric to be detected;
- a selecting module 903, configured to select an effective sampling point of the target segment from the plurality of sampling points based on the time range and sampling time points of the plurality of sampling points; and
- a second determining module 904, configured to determine a color difference value of a target yarn spindle corresponding to the target segment based on a color value and standard value of the effective sampling point In some embodiments, the first determining module includes:

- a first acquiring unit, configured to, in a case where a tension fluctuation of the fabric to be detected is less than a fluctuation threshold value in a whole conveying process, acquire a total time consumption for conveying the fabric to be detected to completely pass through the measurement port; and
- a first determining unit, configured to determine a conveying time consumption required for the target segment based on the total time consumption to obtain the time range In some embodiments, the first determining module includes:

- a second acquiring unit, configured to, in a case where a tension fluctuation of the fabric to be detected is greater than a fluctuation threshold value in a whole conveying process, acquire a conveying process image of conveying the fabric to be detected to the measurement port of the detection portion; where in a process of conveying the fabric to be detected to the detection portion for sampling, the conveying process image is acquired based on a line-scan camera; and
- an analysis unit, configured to perform an image analysis on the conveying process image to determine the time range in which the target segment passes through the measurement port of the detection portion.

In some embodiments, the analysis unit is specifically configured to:

- analyze color values of row pixels of the conveying process image to recognize a segmentation band of different fabric segments; and determine a time range in which the target segment passes through the measurement port of the detection portion based on scanning time of a segmentation band of the target segment.

In some embodiments, the analysis unit is specifically configured to:

input the conveying process image into a pre-trained segmentation band recognition network to recognize a segmentation band of the target segment; and determine the time range in which the target segment passes through the measurement port of the detection portion based on scanning time of the segmentation band of the target segment.

In some embodiments, the selecting module includes:

a second determining unit, configured to determine sampling time of the target segment from the preset sampling time point sequence; and a selecting unit, configured to select, based on the sampling time of the target segment, a sampling point within the time range as the effective sampling point of the target segment.

In some embodiments, the selecting unit is specifically configured to:

merge a sampling point of which sampling time point belongs to the target segment but is determined to be an ineffective sampling point into a set of to-be-processed points, and for each to-be-processed point in the set, perform following operations:

determining a row pixel, of the conveying process image, whose collection time point is closest to a sampling time point of the to-be-processed point; where in a process of conveying the to-be-measured fabric to the detection portion for sampling, acquiring the conveying process image based on a line-scan camera;

in a case where the row pixel does not belong to the segmentation band, determining a fabric segment in which the row pixel is located; and determining the to-be-processed point as an effective sampling point of a fabric segment in which the row pixel is located.

In some embodiments, the effective sampling point is a sampling point not on a segmentation band of the target segment.

For a description of the specific functions and examples of respective modules and sub-modules of the apparatus of the embodiment of the present disclosure, reference may be made to the related description of the corresponding steps in the above-mentioned method embodiments, and details thereof are not described herein again.

In the technical solution of the present disclosure, the acquisition, storage and application of the user's personal information are all in accordance with the relevant laws and regulations, and do not violate the public order and good customs.

Figure 10:
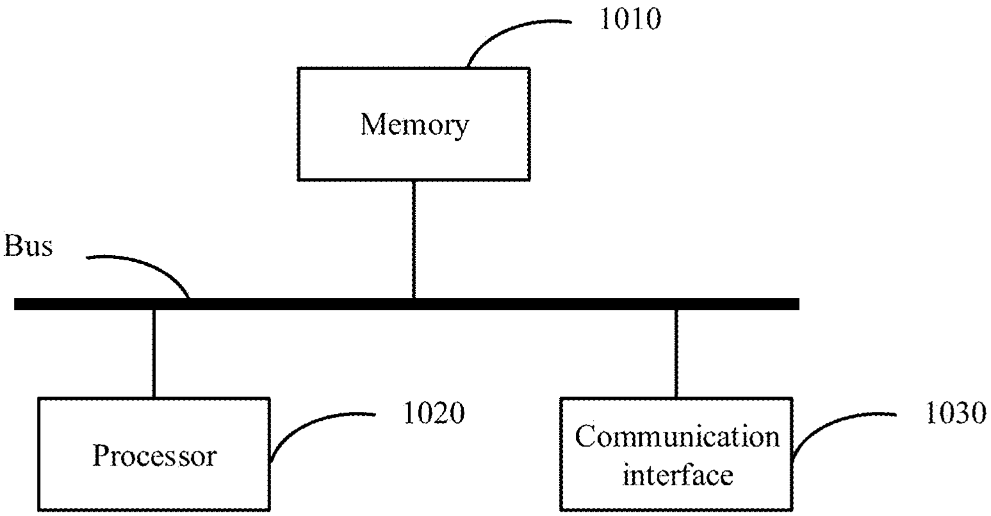
FIG. 10 is a block diagram of an electronic device used to implement the method for measuring a color difference of an embodiment of the present disclosure.

FIG. 10 is a structural block diagram of an electronic device according to an embodiment of the present disclosure. As shown in FIG. 10, the electronic device includes: a memory 1010 and a processor 1020, and the memory 1010 stores a computer program that can run on the processor 1020. There may be one or more memories 1010 and processors 1020. The memory 1010 may store one or more computer programs, and the one or more computer programs cause the electronic device to perform the method provided in the above method embodiment, when executed by the electronic device. The electronic device may further include: a communication interface 1030 configured to communicate with an external device for data interactive transmission.

If the memory 1010, the processor 1020 and the communication interface 1030 are implemented independently, the memory 1010, the processor 1020 and the communication interface 1030 may be connected to each other and complete communication with each other through a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the bus is represented by only one thick line in FIG. 10, but this thick line does not represent only one bus or only one type of bus.

Optionally, in a specific implementation, if the memory 1010, the processor 1020 and the communication interface 1030 are integrated on one chip, the memory 1010, the processor 1020 and the communication interface 1030 may communicate with each other through an internal interface.

It should be understood that the above-mentioned processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may further include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Date SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer-readable storage medium or transmitted from a computer-readable storage medium to another computer-readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer-readable storage medium may be any available medium that can be accessed by a computer, or a data storage device such as a server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer-readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer-readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A method for measuring a color difference, wherein a fabric to be detected is woven based on a plurality of yarn spindles, respective yarn spindles have respectively corresponding fabric segments on the fabric to be detected, there is a segmentation band between different fabric segments, and the method comprising:

conveying respective fabric segments of the fabric to be detected sequentially to a measurement port of a detection portion, so that the detection portion collects color values at a plurality of sampling points on the fabric to be detected according to a preset sampling time point sequence;

determining a time range in which a target segment of the fabric to be detected passes through the measurement port of the detection portion during a process of conveying to the detection portion for sampling; the target segment being any fabric segment of the fabric to be detected;

selecting an effective sampling point of the target segment from the plurality of sampling points based on the time range and sampling time points of the plurality of sampling points; and determining a color difference value of a target yarn spindle corresponding to the target segment based on a color value and standard value of the effective sampling point;

wherein the determining of the time range in which the target segment of the fabric to be detected passes through the measurement port of the detection portion, comprises:

in a case where a tension fluctuation of the fabric to be detected is less than a fluctuation threshold value in a whole conveying process, acquiring a total time consumption for conveying the fabric to be detected to completely pass through the measurement port; and determining a conveying time consumption required for the target segment based on the total time consumption to obtain the time range.

2. The method of claim 1, wherein the determining of the time range in which the target segment of the fabric to be detected passes through the measurement port of the detection portion, comprises:

in a case where a tension fluctuation of the fabric to be detected is greater than a fluctuation threshold value in a whole conveying process, acquiring a conveying process image of conveying the fabric to be detected to the measurement port of the detection portion; wherein in a process of conveying the fabric to be detected to the detection portion for sampling, acquiring the conveying process image based on a line-scan camera; and performing an image analysis on the conveying process image to determine the time range in which the target segment passes through the measurement port of the detection portion.

3. The method of claim 2, wherein the performing of the image analysis on the conveying process image to determine the time range in which the target segment passes through the measurement port of the detection portion, comprises:

analyzing color values of row pixels of the conveying process image to recognize a segmentation band of different fabric segments; and determining a time range in which the target segment passes through the measurement port of the detection portion based on scanning time of a segmentation band of the target segment.

4. The method of claim 2, wherein the performing of the image analysis on the conveying process image to determine the time range in which the target segment passes through the measurement port of the detection portion, comprises:

inputting the conveying process image into a pre-trained segmentation band recognition network to recognize a segmentation band of the target segment; and determining the time range in which the target segment passes through the measurement port of the detection portion based on scanning time of the segmentation band of the target segment.

5. The method of claim 2, wherein the selecting of the effective sampling point of the target segment from the plurality of sampling points based on the time range and the sampling of the time points of the plurality of sampling points, comprises:

determining sampling time of the target segment from the preset sampling time point sequence; and selecting, based on the sampling time of the target segment, a sampling point within the time range as the effective sampling point of the target segment.

6. The method of claim 5, after the selecting of the sampling point within the time range as the effective sampling point of the target segment, further comprising:

determining a sampling point whose sampling time point belongs to the target segment but is not within the time range as a to-be-processed point;

determining a row pixel, of the conveying process image, whose collection time point is closest to the sampling time point of the to-be-processed point; wherein in a process of conveying the fabric to be detected to the detection portion for sampling, acquiring the conveying process image based on a line-scan camera;

in a case where the row pixel does not belong to the segmentation band, determining a fabric segment in which the row pixel is located; and determining the to-be-processed point as an effective sampling point of the fabric segment in which the row pixel is located.

7. The method of claim 1, wherein the effective sampling point is a sampling point not on a segmentation band of the target segment.

8. An electronic device, comprising:

at least one processor; and a memory in communication with the at least one processor; wherein, the memory stores an instruction executable by the at least one processor, and the instruction, when executed by the at least one processor, enables the at least one processor to execute the method of claim 1.

9. The electronic device of claim 8, wherein the determining of the time range in which the target segment of the fabric to be detected passes through the measurement port of the detection portion, comprises:

in a case where a tension fluctuation of the fabric to be detected is greater than a fluctuation threshold value in a whole conveying process, acquiring a conveying process image of conveying the fabric to be detected to the measurement port of the detection portion; wherein in a process of conveying the fabric to be detected to the detection portion for sampling, acquiring the conveying process image based on a line-scan camera; and performing an image analysis on the conveying process image to determine the time range in which the target segment passes through the measurement port of the detection portion.

10. The electronic device of claim 9, wherein the performing of the image analysis on the conveying process image to determine the time range in which the target segment passes through the measurement port of the detection portion, comprises:

analyzing color values of row pixels of the conveying process image to recognize a segmentation band of different fabric segments; and determining a time range in which the target segment passes through the measurement port of the detection portion based on scanning time of a segmentation band of the target segment.

11. The electronic device of claim 9, wherein the performing of the image analysis on the conveying process image to determine the time range in which the target segment passes through the measurement port of the detection portion, comprises:

inputting the conveying process image into a pre-trained segmentation band recognition network to recognize a segmentation band of the target segment; and determining the time range in which the target segment passes through the measurement port of the detection portion based on scanning time of the segmentation band of the target segment.

12. The electronic device of claim 9, wherein the selecting of the effective sampling point of the target segment from the plurality of sampling points based on the time range and the sampling of the time points of the plurality of sampling points, comprises:

determining sampling time of the target segment from the preset sampling time point sequence; and selecting, based on the sampling time of the target segment, a sampling point within the time range as the effective sampling point of the target segment.

13. A non-transitory computer-readable storage medium storing a computer instruction thereon, wherein the computer instruction is used to cause a computer to execute the method of claim 1.

14. The non-transitory computer-readable storage medium of claim 13, wherein the determining of the time range in which the target segment of the fabric to be detected passes through the measurement port of the detection portion, comprises:

in a case where a tension fluctuation of the fabric to be detected is greater than a fluctuation threshold value in a whole conveying process, acquiring a conveying process image of conveying the fabric to be detected to the measurement port of the detection portion; wherein in a process of conveying the fabric to be detected to the detection portion for sampling, acquiring the conveying process image based on a line-scan camera; and performing an image analysis on the conveying process image to determine the time range in which the target segment passes through the measurement port of the detection portion.

15. The non-transitory computer-readable storage medium of claim 14, wherein the performing of the image analysis on the conveying process image to determine the time range in which the target segment passes through the measurement port of the detection portion, comprises:

analyzing color values of row pixels of the conveying process image to recognize a segmentation band of different fabric segments; and determining a time range in which the target segment passes through the measurement port of the detection portion based on scanning time of a segmentation band of the target segment.

16. The non-transitory computer-readable storage medium of claim 14, wherein the performing of the image analysis on the conveying process image to determine the time range in which the target segment passes through the measurement port of the detection portion, comprises:

inputting the conveying process image into a pre-trained segmentation band recognition network to recognize a segmentation band of the target segment; and determining the time range in which the target segment passes through the measurement port of the detection portion based on scanning time of the segmentation band of the target segment.

17. The non-transitory computer-readable storage medium of claim 14, wherein the selecting of the effective sampling point of the target segment from the plurality of sampling points based on the time range and the sampling of the time points of the plurality of sampling points, comprises:

determining sampling time of the target segment from the preset sampling time point sequence; and selecting, based on the sampling time of the target segment, a sampling point within the time range as the effective sampling point of the target segment.

* * * * *